Dec. 13, 1927.
C. A. MOOK
1,652,726
METHOD OF SECURING TIRE STEM PADS TO TUBES
Filed July 16, 1923
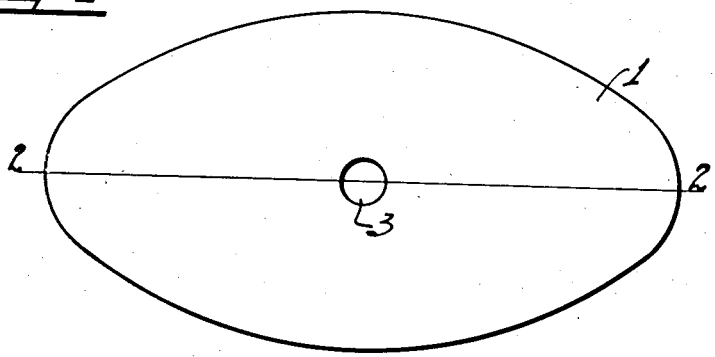
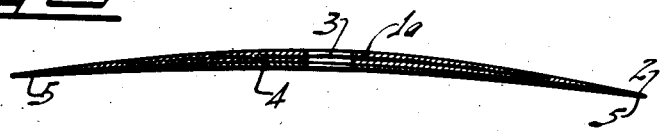
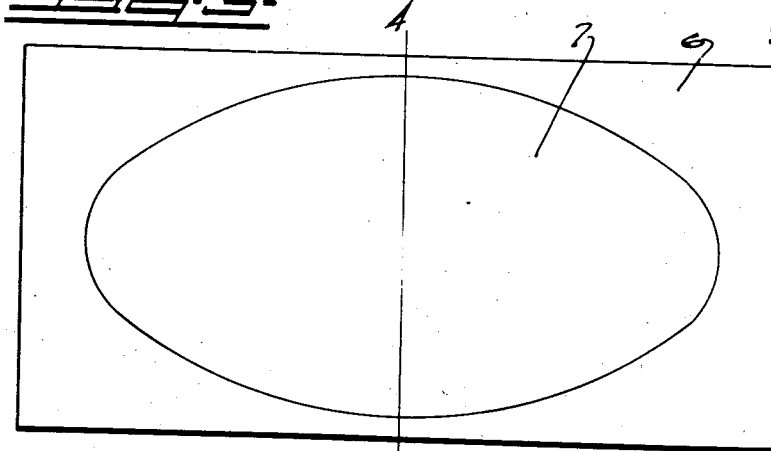
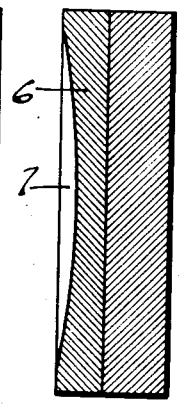
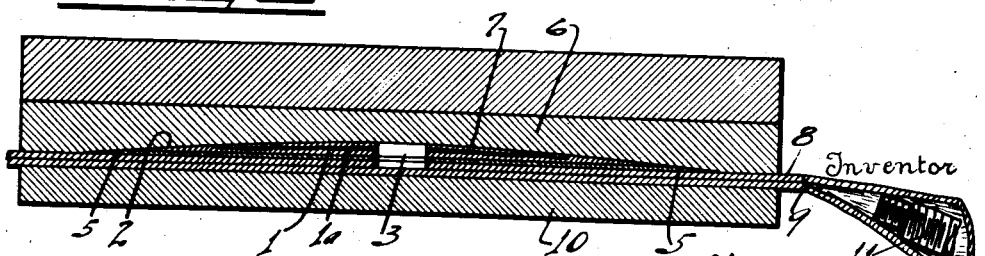
Inventor
Clarence A. Mook
By H.Z. Lond
Attorney Patented Dec. 13, 1927.

1,652,726

UNITED STATES PATENT OFFICE.

CLARENCE A. MOOK, OF ERIE, PENNSYLVANIA.

METHOD OF SECURING TIRE-STEM PADS TO TUBES.

Application filed July 16, 1923. Serial No. 651,783.

This invention is designed to improve the manner of securing tire stem securing pads to tubes. Where tire stems are torn from tubes it is necessary to supply the tube with a new material at the place of securing the stem and to form a permanent bond between the stem and the wall of the tube at this point. The pad also should be of greater strength adjacent to the stem, gradually being of more yielding texture at points remote from the stem so that it may merge with the yielding character of the tube. To carry this out, therefore, the pad should be somewhat thicker at points adjacent to the stem and be beveled toward the edges. In order to properly vulcanize such a pad means should be provided whereby the contact relation between the pad and tube may be maintained throughout with pressure during the vulcanizing operation. The present invention provides a method and apparatus by means of which such a pad may be permanently attached to a tube.

An apparatus by means of which the method may be practiced is illustrated in the accompanying drawings as follows:—

Fig. 1 shows a plan view of the pad.

Fig. 2 a section on the line 2—2 in Fig. 1.

Fig. 3 a plan view of one of the mold plates.

Fig. 4 a section on the line 4—4 in Fig. 3.

Fig. 5 a central section through the mold with a pad in place therein.

1 marks the body of the pad. This is tapered at the edges 2 and has a re-enforcing fabric 1ª surrounding a tire stem opening 3. The body is formed of vulcanized rubber and has a skim coat 4 of vulcanizing rubber arranged on one face of the body and beveled at 5.

A molding plate 6 is provided with a pocket 7 conforming in shape to the shape of the pad so that a pad in place in the pocket prevents a substantially plane surface. In Fig. 5 the walls of the tubes 8 and 9 are shown in position in the mold with the skim coat in contact with the wall of the tube and with the equalized pressure brought about by the walls of the pocket. A flat mold plate 10 is opposed to the plate 6 and these are clamped in any desired manner so as to exert pressure on the pad against the wall of the tube as the vulcanizing proceeds. The vulcanizing is accomplished by heat in any desired manner. A stem 11 is placed within the tube through the original stem opening and is carried within the tube outside the mold during the vulcanizing and afterwards brought to place through the opening.

What I claim as new is:—

The method of securing tire stem pads to tire tubes having tire stem openings therein which consists in forming a pad with a body of vulcanized rubber having a stem opening therein and a skim coat of vulcanizing rubber arranged on the body, placing a tire stem in the tube through the stem opening in the tube, placing the pad with the skim coat in pressure contact with the walls of the tube at the tire stem opening in the tube and vulcanizing the skim coat in place bonding the body of rubber to the wall of the tube.

In testimony whereof I have hereunto set my hand.

CLARENCE A. MOOK.